United States Patent [19]
Federici et al.

[11] Patent Number: 5,633,423
[45] Date of Patent: May 27, 1997

[54] CONSUMABLE ANODE, ELECTRODISSOLUTION PROCESS APPLIED TO THE DECONTAMINATION OF SLIGHTLY RADIOACTIVE LIQUID EFFLUENTS AND APPARATUS FOR PERFORMING THE PROCESS

[75] Inventors: Véronique Federici, Ramosque; Eric Tronche, Aix en Provence; Germain Lacoste, Tournefeutille, all of France

[73] Assignee: Campagnie Generale des Matieres Nucleaires, Velizy-Villacoublay, France

[21] Appl. No.: 489,553

[22] Filed: Jun. 12, 1995

[30] Foreign Application Priority Data

Jun. 14, 1994 [FR] France ........................... 94 07249

[51] Int. Cl.$^6$ ........................... G21F 9/06; C02F 1/469
[52] U.S. Cl. ........................... 588/204; 75/10.23; 205/43; 205/44; 205/45; 205/46; 205/771; 204/293; 588/20
[58] Field of Search ........................... 75/10.23, 302; 588/204, 20; 204/292, 293, 291; 420/80, 447, 454, 551, 550; 205/771, 43, 44, 45, 46

[56] References Cited

FOREIGN PATENT DOCUMENTS 0295696  12/1988  European Pat. Off..

OTHER PUBLICATIONS

Derwent patent absrtract—Mitsubishi Materials Corp., JP 05147907 Jun. 15, 1993.

Derwent patent abstract—Japan Atomic Energy Res. Inst. and Mitsui Mining & Smelting, JP 55043478 Mar. 27, 1980.

Derwent patent abstract—AS UKR Colloid Chem. and PATON Electrowed Inst., SU 415239 Nov. 18, 1976.

Database WPI, Section Ch, Week 8238, Derwent Publications Ltd., London, GB; Class D15, AN 82–80737E, & SU-A-882 945 (Danilovskii Yu S), 23 Nov. 1981.

Database WPI, Week 8019, Derwent Publications Ltd., London, GB; AN 80–33722C & JP-A-55 043 478 (Japan Atomic Energy), 28 Mar. 1980.

International Journal of Applied Radiation and Isotopes, vol. 19, 1968 UK, pp. 485–487, Kepak et al.: "Sorption of Radioruthenium in Colloidal and Ionic State on Ferrous Hydroxide Formed by Electrodissolution of Iron Anode".

Database WPI, Section Ch, Week 8846, Derwent Publications Ltd., London, GB; Class D15, AN 88–328566, & SU-A-1 392 144 (Odess Eng Cons. Inst), 30 Apr. 1988.

Primary Examiner—T. Tung
Assistant Examiner—Alex Noguerola
Attorney, Agent, or Firm—Pearne, Gordon, McCoy & Granger

[57] ABSTRACT

According to the invention, a consumable anode constituted by a metal alloy incorporates between 20 and 70 wt. % iron, between 20 and 40 wt. % cobalt and between 5 and 30 wt. % aluminium. To these basic constituents can optionally be added elements such as nickel and/or titanium and/or copper and/or niobium. The decontamination process involves an electrodissolution of said anode.

15 Claims, 2 Drawing Sheets

CONSUMABLE ANODE, ELECTRODISSOLUTION PROCESS APPLIED TO THE DECONTAMINATION OF SLIGHTLY RADIOACTIVE LIQUID EFFLUENTS AND APPARATUS FOR PERFORMING THE PROCESS

TECHNICAL FIELD OF THE INVENTION

The present invention relates to the processing of effluents containing small amounts of radionucleides (below approximately $5.10^3$ kBq/liter), such as e.g. strontium 90 ($^{90}$Sr), antimony 125 ($^{125}$Sb), cesium 137 $^{137}$Cs), and ruthenium 106 ($^{106}$Ru).

More specifically, the invention relates to the decontamination of such effluents by the electrodissolution of an anode permitting the concentration in solid form and in a small volume allowing easy storage of the contamination present in the effluent.

PRIOR ART

A process for the decontamination of a solution containing ruthenium 106 by the electrodissolution of an iron anode is known from the article by F. KEPAK et al, published in "International Journal of Applied Radiation and Isotopes", vol. 19, pp 485–487, 1968. According to the procedure described in this document, the ruthenium is trapped by iron hydroxide particles. These particles are obtained by precipitation or dissolution by electrolysis of an iron anode. This procedure is applied to a solution containing a high ruthenium radioactivity ($42 \times 10^6$ kBq/liter), i.e. a high concentration. Tests relating to the decontamination by electrodissolution of an iron anode on effluents, whose radioelement concentrations are approximately $10^4$ times lower have made it possible to obtain max 20% decontamination factors for ruthenium.

DESCRIPTION OF THE INVENTION

The invention therefore relates to a consumable anode, a process for the electrodissolution of said anode and an apparatus for the performance thereof making it possible to attain high decontamination rates, at least for effluents with low radioelement concentrations.

More specifically, a consumable anode according to the invention has between 20 and 70% by weight iron, between 20 and 40% by weight cobalt and between 5 and 30% by weight aluminium, the sum total of the weight percentages of these three elements being equal to or below 100.

The electrodissolution of such an anode makes it possible to form, in the solution in which the anode is immersed, mixed hydroxides formed from iron, cobalt and aluminium. These hydroxides have an entraining effect on the radioelements present in the solution. The effectiveness of this entraining effect is linked with the simultaneous presence of the three elements.

According to variants of the anode according to the invention, it can also contain nickel (less than 20 wt. %) and/or titanium (less than 10 wt. %) and/or copper (less than 5 wt. %) and/or niobium (less than 5 wt. %).

The presence of these additional elements makes it possible to improve the precipitation and extraction of certain specific elements present in the solution. Thus, the presence in the anode of niobium and/or titanium makes it possible to improve antimony extraction. The presence in the anode of nickel and/or copper makes it possible to improve ruthenium extraction.

The composition of the anode alloy determines the type and proportions of the insoluble hydroxide mixture, which are absorbing supports which, by coprecipitation, dissolve the radioelements. Thus, the weight of the metallic hydroxides formed is a function of the dissolved anode weight.

The invention also relates to a process for the decontamination of radioactive liquid elements comprising the following stages:

placing an anode like that described hereinbefore, as well as a cathode, in the liquid effluent, bringing the pH of the effluent to a value equal to or higher than 1, producing a direct current between the anode and the cathode, so that the potential of the anode is above 2 V/NHE (Normal Hydrogen Electrode).

With such a process, the anode is dissolved to form insoluble metallic hydroxides, which entrain by coprecipitation the radioelements of the effluent. With this process it has proved possible to attain decontamination rates above 90% for certain elements, e.g. antimony and strontium.

According to an embodiment of the process, the current is circulated until the electricity quantity consumed is equal to at least 8 coulombs/milliliter.

According to another embodiment of the invention, part of the mud or sludge obtained after precipitation and entrainment of the radioelements can be recycled into the reactor, the other part undergoing a separation stage by decanting or settling, filtration or centrifuging in order to separate the insoluble precipitate of metallic hydroxides from the effluent.

According to another aspect of the invention, an apparatus for performing the decontamination process comprises a reactor for receiving the effluent to be decontaminated, an anode like that described hereinbefore, a cathode, a direct current supply to which are connected the anode and the cathode and a means for raising the pH of the solution to a value equal to or greater than 1.

According to an embodiment of the apparatus, it can also comprise a reference electrode. It can also comprise a temperature control thermocouple and a heat exchanger permitting the maintaining of the effluent at ambient temperature.

It can finally incorporate means for recycling part of the sludge passing out of the reactor and solid/liquid separating means for treating another part of the extracted sludge.

BRIEF DESCRIPTION OF THE DRAWINGS

Features and advantages of the invention can be better gathered in the light of the following description, which relates to non-limitative embodiments and the attached drawings, wherein show.

DETAILED DESCRIPTION OF THE INVENTION

Figure 1:
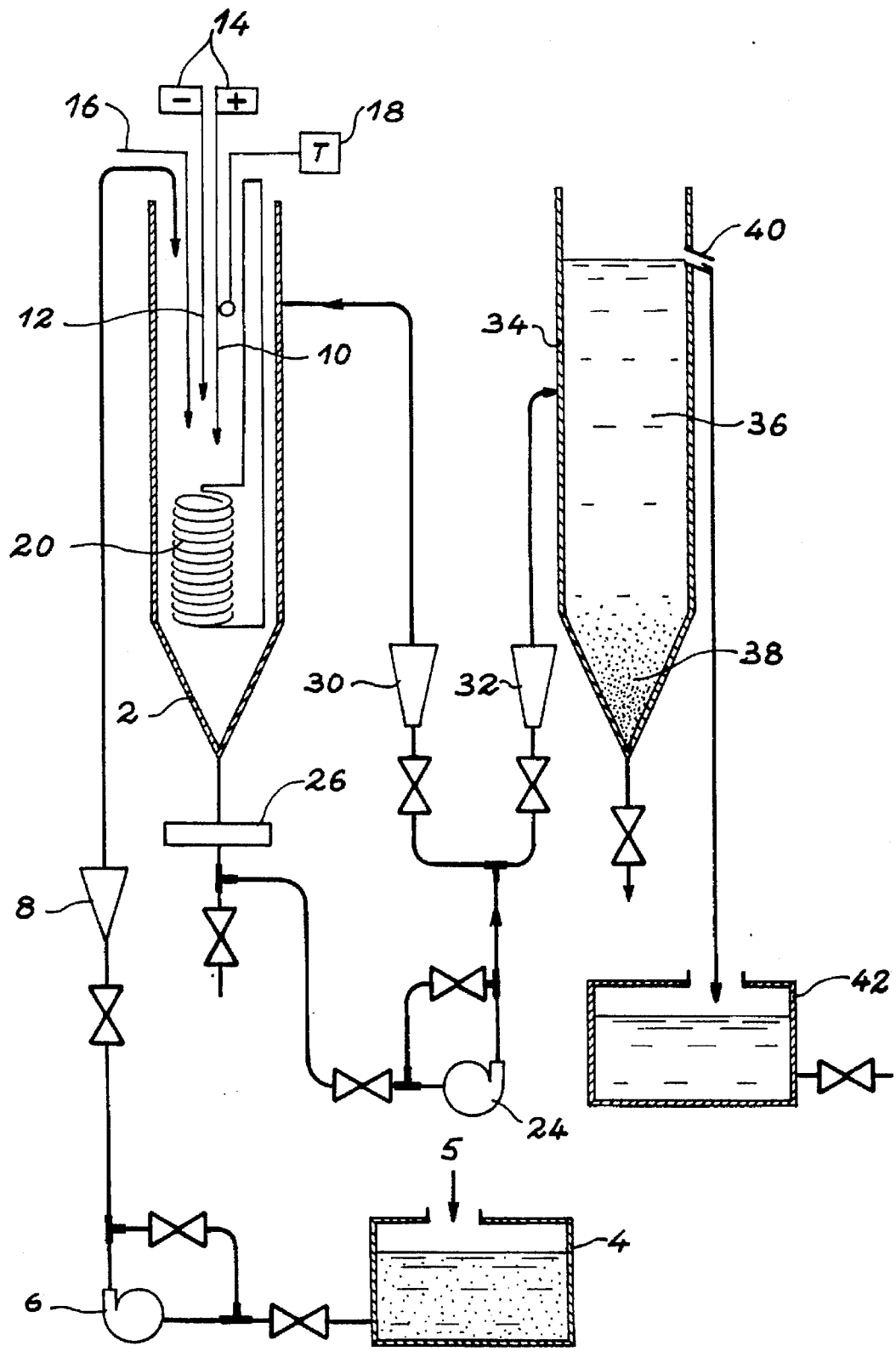
FIG. 1 An apparatus for performing the invention.

The metal anode according to the invention is constituted by a metal alloy having between 20 and 70 wt. % iron, between 20 and 40 wt. % cobalt and between 5 and 30 wt. % aluminium. To these basic constituents can optionally be added other constituents in the composition of the anode.

Thus, for example, it is optionally possible to add elements such as nickel (wt. % below 20), and/or titanium (wt.

% equal to or below 10), and/or copper (wt. % below 5) and/or niobium (wt. % below 5).

In order to obtain such an anode, intimate mixing takes place in a crucible of powders of the metals constituting the alloy, followed by the melting of said powder mixture in an induction furnace at a temperature of 1800° C. and under an inert atmosphere.

The decontamination process then consists of placing the anode according to the invention, as well as a cathode, in the effluent to be treated. In the case when it is below 1, the initial pH of the solution is brought to a value above 1. Under these conditions, during the passage of the electric current, the hydroxides produced on the cathode make it possible to increase the pH of the effluent up to a value above 7.6, above which all the metal hydroxides are insoluble.

An electric current is then established between the electrodes, so that the anode potential is above 2 V/NHE, e.g. 5 V/NHE or a value close to 5 V/NHE. Under these conditions, the anode is dissolved to form insoluble, mixed metal hydroxides, which entrain by coprecipitation the radioelements of the effluent. The iron more specifically entrains strontium and antimony; cobalt entrains antimony and ruthenium; aluminum entrains strontium. Elements such as nickel, titanium, copper or niobium, added to the composition of the anode, make it possible to improve the extraction of certain radioelements. Thus, the presence of niobium and/or titanium makes it possible to improve the extraction of antimony, whereas the presence of nickel and/or copper makes it possible to improve ruthenium extraction.

The alloy of the anode is dissolved producing a mixture of metal cations:

$$M \rightarrow M^{z+} + Ze^-.$$

At the cathode, for each ion produced, the electron exchange induces the reaction:

$$zH_2O + Ze^- \rightarrow ZOH^- + \frac{z}{2} H_2.$$

A mixture of metal hydroxides is produced according to the reaction:

$$M^{z+} + Z(OH)^- \rightarrow M(OH)_z.$$

These metal hydroxides are absorbing supports, which trap and entrain by coprecipitation the radioelements in solution.

The precipitate formed by the metal hydroxides has the following advantageous characteristics linked with the anode composition:

- it is very insoluble and therefore does not pollute the effluent by cations coming from the anode (less than 0.3% of the total metal weight dissolved);
- it has a high stability in time and perfectly retains the fixed radioelements, even in the case where the potential of the solution evolves towards an equilibrium potential;
- the "reagents" of this process are solely electricity and the consumable anode;
- unlike chemical processes, this process does not lead to an increase in the effluent volume.

The process can be allowed to continue until the consumed electricity quantity is adequate for obtaining the desired decontamination of the effluent. Thus, the process can be left until the consumed electricity quantity is at least equal to 8 coulombs/milliliter, e.g. 9 (±1) coulombs/milliliter.

A subsequent solid/liquid separation stage, e.g. by decanting, filtering or centrifuging the sludge obtained by the coprecipitation makes it possible to separate the insoluble precipitate of metal hydroxides from the treated liquid effluent.

According to a variant, it is also possible to reinject part of the sludge into the reactor. Thus, the sludge is mainly constituted by metal hydroxides, which are absorbing agents and entraining agents of radioelements. Their capacity to entrain radioelements is not necessarily exhausted as from the first adsorption in the reactor and consequently it may be of interest to reinject them in order to reduce the mud or sludge weight produced.

The apparatus for performing this process will now be described. This apparatus comprises an electrochemical reactor 2 for receiving the effluent to be decontaminated and which comes from a tank 4 by means of a pump 6. The effluent volume injected into the reactor is controlled by a rotameter 8. For the process to take place in a satisfactory manner, the pH of the solution injected into the reactor 2 must be equal to or above 1.

Thus, the tank 4 can have means 5 for measuring and regulating the pH of said solution. These means can e.g. serve to add a 10N soda solution until the glass electrode coupled to a pH meter indicates a value of >1.

The reactor contains a consumable anode 10 and a cathode 12. These two electrodes are connected to a direct current supply 14. The consumable anode (iron/cobalt/aluminium optionally with nickel and/or titanium and/or copper and/or niobium) has a composition like that described hereinbefore and the cathode can e.g. be a stainless steel. The reactor can also have a reference electrode 16, e.g. a saturated calomel electrode, a temperature control thermocouple 18 and a heat exchanger 20 making it possible to keep the effluent at ambient temperature.

The sludge, i.e. the radioelement-carrying metal hydroxide precipitates can be extracted from the reactor by a pump 24. Between the outlet of the reactor and the pump 24 it is possible to have a filter 26, which optionally permits the recovery of anode fragments which might damage the recycling pump 24. Part of the sludge volume extracted from the reactor can be reinjected, by means of a rotameter 30, into said reactor. Another part, which passes through a rotameter 32, is injected into a sludge decanting or settling means 34, which makes it possible to separate the radioactive element-depleted treated solution 36 and the radioactive element-carrying sludge 38. The treated solution can then be discharged, by an overflow orifice 40, to a tank 42.

According to an example, the sludge decanter 34 receives approximately 1/10 of the sludge volume leaving the reactor 2, whereas 9/10 of the sludge volume are recycled to the reactor 2.

The following table I gives three anode composition examples as a wt. % of each of the constituents. The anode 1 solely comprises the three elements cobalt, iron and aluminum.

Examples of decontamination processes using these anodes are given hereinafter.

TABLE 1

| wt. % | Co | Fe | Al | Ni | Ti | Cu | Nb |
|---|---|---|---|---|---|---|---|
| ANODE 1 | 30 | 50 | 20 | 0 | 0 | 0 | 0 |
| ANODE 2 | 24.6 | 52.1 | 5.1 | 14.6 | 1 | 2.6 | 0 |
| ANODE 3 | 35 | 35 | 7.5 | 14 | 4.5 | 3.5 | 0.5 |

EXAMPLE 1

In this example working takes place with the anode 1 raised to a potential of 4.9 V. The electricity quantity consumed during the process is 9.8 coulombs/milliliter. The chosen solution is an effluent with a low radioactivity and having the following characteristics:

pH=8.4, $NaNO_3$ concentration: 0.5M, $^{125}Sb$ activity: 1200 kBq/l (i.e. 30 μg of $^{125}Sb$ per m$^3$), $^{90}Sr$ activity: 220 kBq/l (i.e 40 μg of $^{90}Sr$ per m$^3$), $^{106}Ru$ activity: 40 kBq/l, $^{137}Cs$ activity: 17 kBq/l, alpha emitter actinide activity: 330 Bq/l.

Table II illustrates the performance characteristics obtained by the process according to the invention. This table gives the decontamination rate (DR), i.e. the percentage of each of the radioelements eliminated by the precipitates formed by electrodissolution. It can be seen that decontamination rates above 90% are obtained for antimony, strontium and cesium. A percentage of 40 is obtained for ruthenium, which is superior to the results obtained with the prior art process (electrodissolution of an iron anode: 20%).

TABLE II

| ELEMENT | $^{125}Sb$ | $^{90}Sr$ | $^{106}Ru$ | $^{137}Cs$ | ACTINIDES |
|---------|-----------|-----------|-----------|-----------|-----------|
| DR %    | 90        | 97.3      | 40        | 90        | >82       |

EXAMPLE 2

This example uses the same anode raised to the same potential as in example I. The consumed electricity quantity is 10.1 coulombs/milliliter. The chosen effluent has the following characteristics:

pH=7.05, $NaNO_3$ concentration: 0.4M, $^{125}Sb$ activity: 265 kBq/l (i.e. 30 μg of $^{125}Sb$ per m$^3$), $^{90}Sr$ activity: 640 kBq/l (i.e 40 μg of $^{90}Sr$ per m$^3$), $^{106}R$ activity: 366 kBq/l, $^{137}Cs$ activity: 30 kBq/l, alpha emitter actinide activity: 430 Bq/l.

Table III summarizes the decontamination rates of the radioelements eliminated by electroformed precipitates in this example. It can be seen that the decontamination rates reached are still very high with regards antimony and strontium (above 99% for the latter).

TABLE III

| ELEMENT | $^{125}Sb$ | $^{90}Sr$ | $^{106}Ru$ | $^{137}Cs$ | ACTINIDES |
|---------|-----------|-----------|-----------|-----------|-----------|
| DR %    | 90        | 99.4      | 47        | 60        | >86       |

Figure 2:
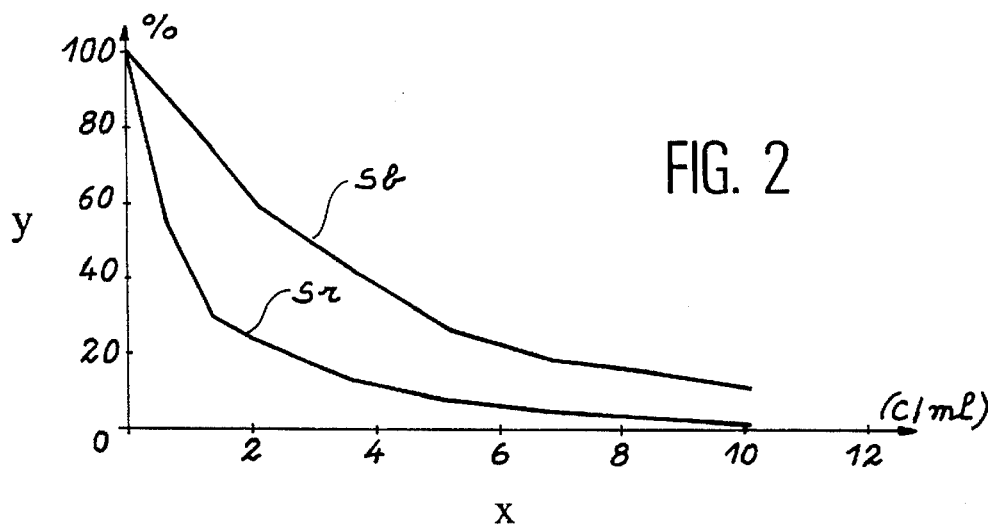
FIGS. 2 to 4 for different electrodes and different effluents, the evolution of quantities of certain elements remaining in the effluent as a function of the consumed electricity quantity.

The graph of FIG. 2 gives the antimony and strontium quantities (y axis) remaining in the effluent of example 2 (i.e. 100-DR %), as a function of the electricity quantity consumed in the circuit (x axis), the anode used being anode I. It can be seen that the radioactivity of the effluent decreases in a non-linear manner and that the strontium decontamination is faster than that of antimony. The decontamination effect on strontium is very distinct as from approximately 1 or 2 C/ml. For 10 C/ml there is only 10% of the initial antimony, whereas the strontium has virtually disappeared.

EXAMPLE 3

In this example the anode chosen is anode 2 (cf. table I), raised to a potential of 4.9 V. The consumed electricity quantity is 10.2 C/ml. The chosen effluent has the same characteristics as that given in example 2. The performance characteristics of the decontamination are summarized in table IV, which gives the percentage of radioelements eliminated by electroformed precipitates. It can be seen that the process is extremely efficient with regards to strontium and antimony decontamination, because for these elements decontamination rates respectively of more than 99% and more than 92% are obtained. The performance characteristics with regards to ruthenium are also very good, because the decontamination rate is 61%, which is better than that obtained with the prior art process.

TABLE IV

| ELEMENT | $^{125}Sb$ | $^{90}Sr$ | $^{106}Ru$ | $^{137}Cs$ | ACTINIDES |
|---------|-----------|-----------|-----------|-----------|-----------|
| DR %    | 92.3      | 99.5      | 61        | 72        | 86        |

Figure 3:
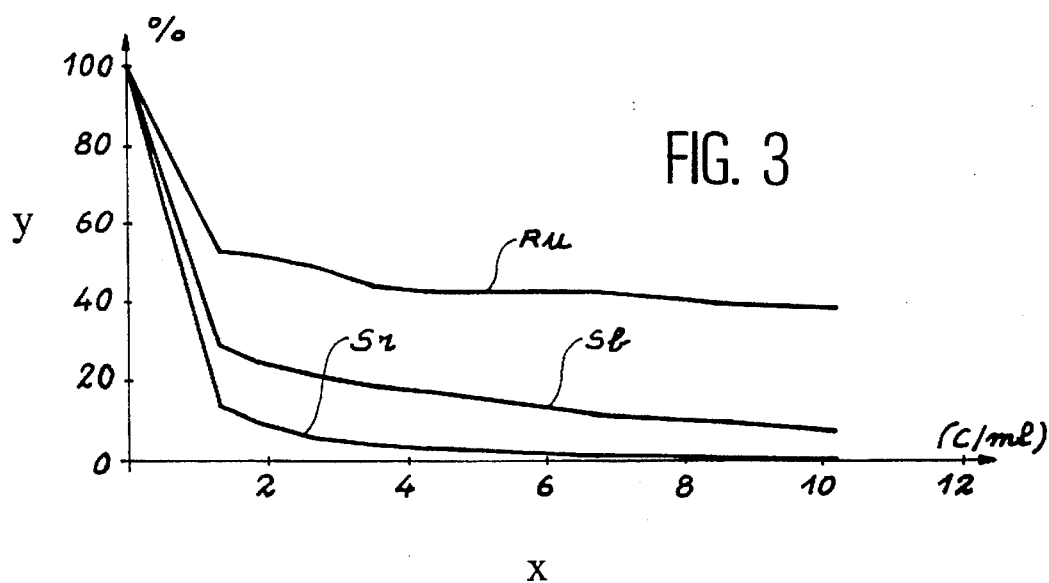

The graph of FIG. 3 gives the ruthenium, antimony and strontium quantities (y axis) remaining in the effluent of example 3, as a function of the electricity quantity consumed in the circuit (x axis), the anode used being anode 2. It can be seen that the radioactivity decreases in a non-linear manner and that the strontium decontamination is faster than that of antimony or ruthenium. The decontamination effect is very distinct from approximately 1 or 2 C/ml.

EXAMPLE 4

This example uses anode 3 raised to a potential of 4.9 V. The electricity quantity consumed in the circuit is 10.7 C/ml. The effluent used has a composition identical to that of example 2. Table V summarizes the decontamination rates once again with very high values as regards strontium and cesium.

TABLE V

| ELEMENT | $^{125}Sb$ | $^{90}Sr$ | $^{106}Ru$ | $^{137}Cs$ | ACTINIDES |
|---------|-----------|-----------|-----------|-----------|-----------|
| DR %    | 89.9      | 98.3      | 48        | 98        | >86       |

Figure 4:
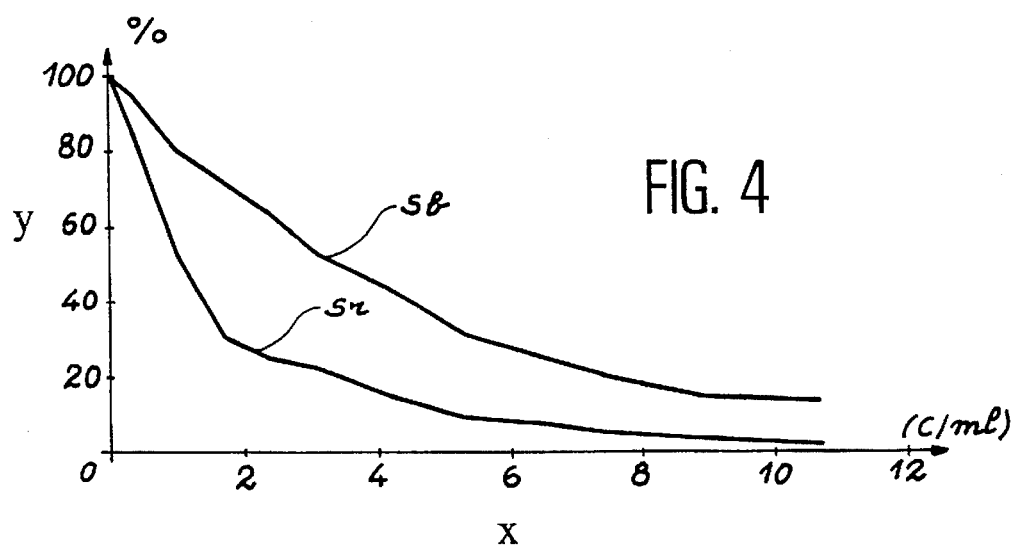

For example 4, FIG. 4 gives the evolution of the antimony and strontium quantities (y axis) remaining in the effluent as a function of the consumed electricity quantity (x axis). FIG. 4 is to be likened to FIG. 2. An effective decontamination is obtained on reaching 10 ml C/ml, but here again a very distinct effect occurs as from 1 or 2 C/ml, particularly for strontium.

We claim:

1. A process for decontamination of radioactive liquid effluents, comprising the steps of placing a consumable anode and a cathode in the liquid effluent in a reactor, bringing the pH of the effluent to a value equal to or above 1, and establishing a direct current between the electrodes while maintaining the potential of the anode at a value equal to or above 2 V/NHE until the consumed electricity quantity is equal to or above 8 coulombs/milliliter, wherein said consumable anode is constituted by a metal alloy comprising between 20 and 70 wt. % iron, between 20 and 40 wt. % cobalt and between 5 and 30 wt. % aluminum, the total sum of the weight percentages of these three elements being equal to or below 100.

2. A process according to claim 1, wherein the step of establishing a direct current between the electrodes includes maintaining the potential of the anode at substantially 5.0 V/NHE.

3. A process according to claim 1 or 2, including the further steps of extracting the sludge formed in the reactor, reinjecting into said reactor a part of the extracted sludge, and separating the remaining part of the extracted sludge by solid/liquid separation.

4. A process according to claim 1 or 2, wherein said consumable anode also comprises less than 20 wt. % nickel.

5. A process according to claim 1 or 2, wherein consumable anode also comprises less than 10 wt. % titanium.

6. A process according to claim 1 or 2, wherein said consumable anode also comprises less than 5 wt. % copper.

7. A process according to claim 1 or 2, wherein said consumable anode also comprises less than 5 wt. % niobium.

8. A process for decontamination of radioactive liquid effluents, containing antimony, or ruthenium, or strontium, or cesium or actinides, comprising the steps of placing a consumable anode and a cathode in the liquid effluent in a reactor, bringing the pH of the effluent to a value equal to or above 1, and establishing a direct current between the electrodes while maintaining the potential of the anode at a value equal to or above 2 V/NHE, wherein said consumable anode is constituted by a metal alloy comprising between 20 and 70 wt. % iron, between 20 and 40 wt. % cobalt and between 5 and 30 wt. % aluminum, the total sum of the weight percentages of these three elements being equal to or below 100.

9. A process according to claim 8, wherein the step of establishing a direct current between the electrodes includes maintaining the potential of the anode at substantially 5.0 V/NHE.

10. A process according to claim 8 or 9, wherein the step of establishing a direct current between the electrodes includes maintaining the current until the consumed electricity quantity is equal to or above 8 coulombs/milliliter.

11. A process according to claim 8 or 9, including the further steps of extracting the sludge formed in the reactor, reinjecting into said reactor a part of the extracted sludge, and separating the remaining part of the extracted sludge by solid/liquid separation.

12. A process according to claim 8 or 9, wherein said consumable anode also comprises less than 20 wt. % nickel.

13. A process according to claim 8 or 9, wherein consumable anode also comprises less than 10 wt. % titanium.

14. A process according to claim 8 or 9, wherein said consumable anode also comprises less than 5 wt. % copper.

15. A process according to claim 8 or 9, wherein said consumable anode also comprises less than 5 wt. % niobium.

* * * * *